US006269337B1

United States Patent
Desmond et al.

(10) Patent No.: US 6,269,337 B1
(45) Date of Patent: Jul. 31, 2001

(54) METHOD AND APPARATUS TO PROVIDE ENHANCED DIRECTORY ASSISTANCE INFORMATION IN A COMMUNICATION NETWORK

(75) Inventors: Martha Desmond, Cranford; Karrie Jo Hanson, Westfield; Bethany Scott Robinson, Lebanon; David G. Unger, Mendham Township, Morris County; Michael Chris Varley, Westfield, all of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/122,124

(22) Filed: Jul. 24, 1998

(51) Int. Cl.[7] .................................................. G10L 15/22
(52) U.S. Cl. ...................................... 704/270.1; 704/275
(58) Field of Search .................................. 379/399, 88.1, 379/88.7, 233; 704/270, 270.1, 200, 260, 275

(56) References Cited

U.S. PATENT DOCUMENTS

| | | | |
|---|---|---|---|
| 5,479,488 | * | 12/1995 | Lennig et al. .................... 379/88.04 |
| 5,555,290 | * | 9/1996 | McLeod et al. ....................... 379/67 |
| 5,625,296 | * | 4/1997 | Takahashi et al. ................... 324/753 |
| 5,727,046 | * | 3/1998 | Almulla ............................ 379/88.16 |
| 5,790,634 | * | 8/1998 | Kinser, Jr. et al. ..................... 379/29 |
| 5,819,092 | * | 10/1998 | Ferguson et al. ..................... 395/701 |
| 5,832,433 | * | 11/1998 | Yashchin et al. ..................... 704/260 |
| 5,867,562 | * | 2/1999 | Scherer ............................... 379/112 |
| 5,884,032 | * | 3/1999 | Bateman et al. ..................... 709/204 |
| 5,901,214 | * | 5/1999 | Shaffer et al. ........................ 379/220 |
| 5,991,799 | * | 11/1999 | Yen et al. ............................. 709/218 |

OTHER PUBLICATIONS

U.S. Patent application Ser. No. 08/635,801, filed Apr. 22, 1996, entitled "Method and Apparatus for Information Retrieval Using Audio Interface", ABN.

* cited by examiner

*Primary Examiner*—Richemond Dorvil

(57) ABSTRACT

An operator receives a request for directory information about a listed party over a telephone connection. It is then determined if enhanced directory information for the listed party is available in an enhanced information database. The enhanced directory information associated with the listed party is retrieved, from the enhanced information database, as a script that incorporates the enhanced directory information. The enhanced directory information can then be provided using the script. The enhanced directory information can be stored, for example, on a Web server that is updated by the listed party and the information can be transferred using a Phone Markup Language script.

25 Claims, 4 Drawing Sheets

METHOD AND APPARATUS TO PROVIDE ENHANCED DIRECTORY ASSISTANCE INFORMATION IN A COMMUNICATION NETWORK

FIELD OF THE INVENTION

The present invention relates to communication networks. More particularly, the present invention relates to a method and apparatus that provide enhanced directory assistance information in a communication network.

BACKGROUND OF THE INVENTION

Many communication network providers offer some type of directory assistance service to people using the network. FIG. 1 is a block diagram including one such known directory assistance system. Generally, a person uses a telephone 100 to access a directory assistance platform 200, such as one staffed by a directory assistance operator. For example, a person may call a directory assistance operator to find the telephone number or address of a particular "listed party," such as a merchant. The person tells the operator the name, city and perhaps the county of the listed party. With this information, the operator accesses a directory assistance database 250 and determines the listed party's telephone number and address.

With some directory assistance services, such as AT&T's "00" INFO[SM] service, additional information can be made available to callers. For example, the operator can search for and find the names and addresses of certain types of establishments, e.g., Mexican restaurants, in a particular area. Such directory assistance services are useful, but only a limited amount of additional information is practically available. Often, a person wants to know even more detailed information about a particular listed party, such as business hours, items on a restaurant's menu or whether there are any rooms available in a hotel. This "enhanced" level of information is not currently available to a directory assistance operator.

Even if enhanced information were made available, it would not be practical to have an operator read such information to a user, or to otherwise interact with the user by reviewing material and answering detailed questions about enhanced listed party information since operator time is a very expensive resource for a communication network provider.

Moreover, unlike a listed party's address and telephone number, this type of enhanced information will change frequently. A restaurant, for example, might include daily specials that are being served. It is not practical for the network service provider to buy or maintain such a database, perhaps including hundreds of thousands of listed parties, when the information changes this frequently.

As shown in FIG. 1, some Internet-based information directories can contain information beyond the listed party's traditional name, address and telephone number. These directories typically display a listed party's World Wide Web page, or "Web" page, to a user. A Web page is a Hypertext Markup Language (HTML) document 430 that can be sent to a user over the Internet 500 using a set of rules, called Hypertext Transfer Protocol (HTTP), that allow the exchange of information including text, graphic images, sound, video, and other multimedia files. As used herein, the term "script" refers to either an HTML document or a program that generates an HTML document.

A Web page is generally accessed through an address called a Uniform Resource Locator (URL). For example, a particular listed party's Web page associated with a URL may contain the listed party's hours, text or audio advertising information, or pointers to other Web pages. The HTML scripts 430 are maintained on a computer 400, known as a Web "server," and can be designed to incorporate information in a database 440 that can be directly updated by the listed party as often as required. These Internet-based directories, however, can only be used by people with a computer connected to the Internet 500. Many people do not have access to the Internet 500, are not near a computer when looking for this type of information, or find it otherwise inconvenient to retrieve information this way.

A network service provider's users would find it very helpful if enhanced information was available through a telephone based directory assistance system. Additionally, the network service provider could generate revenue by charging listed parties a fee to be included in the enhanced information database. Finally, a listed party would be happy to be able to provide customers with detailed information that can be easily accessed.

In view of the foregoing, it can be appreciated that a substantial need exists for a method and apparatus that makes enhanced directory assistance information available over a telephone, and solves the other problems discussed above.

SUMMARY OF THE INVENTION

The disadvantages of the art are alleviated to a great extent by a method and apparatus that provide enhanced directory assistance information. In one embodiment of the present invention, an operator receives a request for directory information about a listed party over a telephone connection. It is then determined if enhanced directory information for the listed party is available in an enhanced information database. The enhanced directory information associated with the listed party is retrieved, from the enhanced information database, as a script that incorporates the enhanced directory information. The enhanced directory information can then be provided using the script. The enhanced directory information can be stored, for example, on a Web server that is updated by the listed party and the information can be transferred using a Phone Markup Language script. According to one embodiment of the present invention, listed parties may update their own listings, and these updates will be immediately available to callers.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
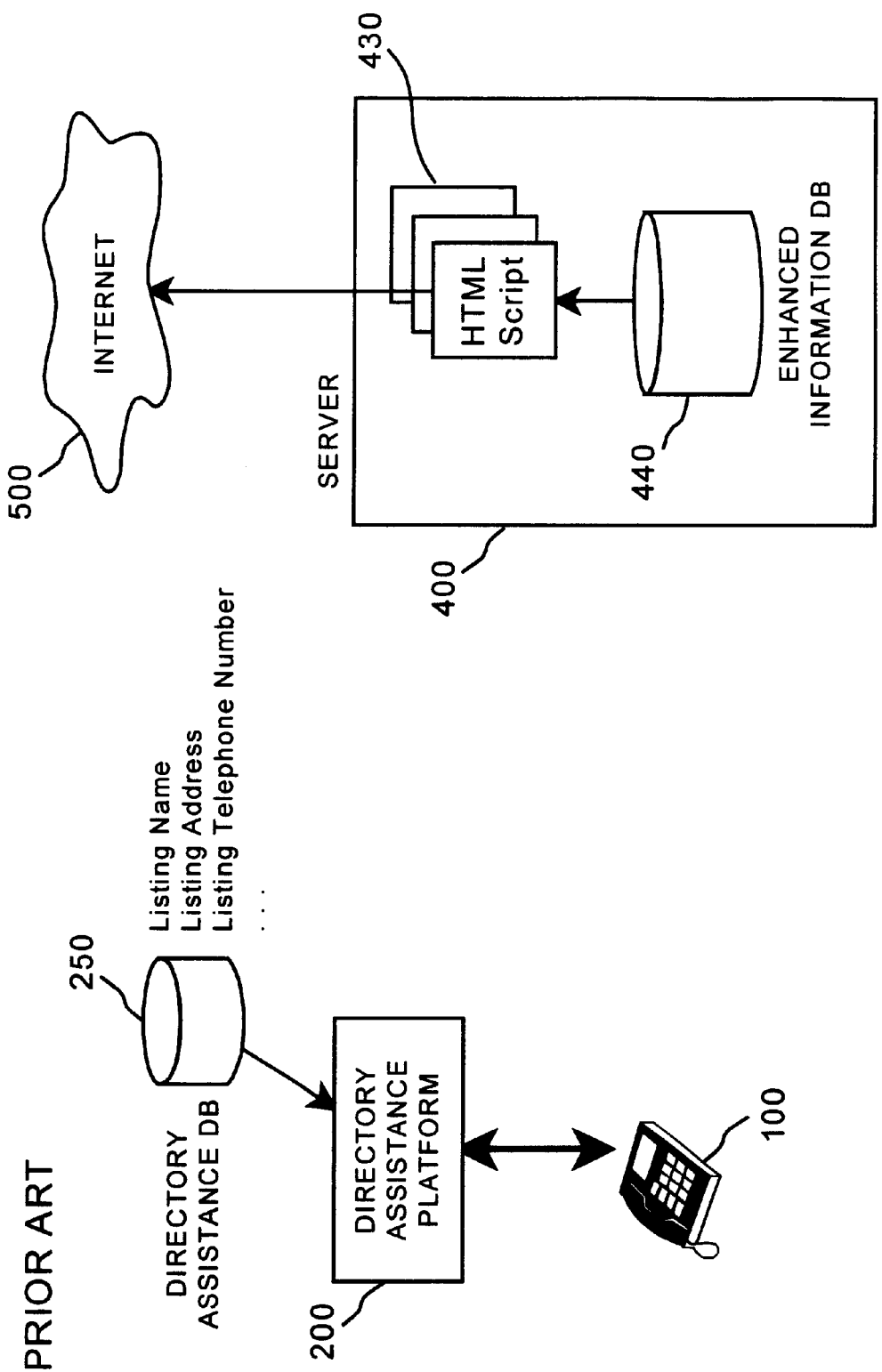
FIG. 1 is a block diagram of known directory assistance and Web information systems.
Figure 2:
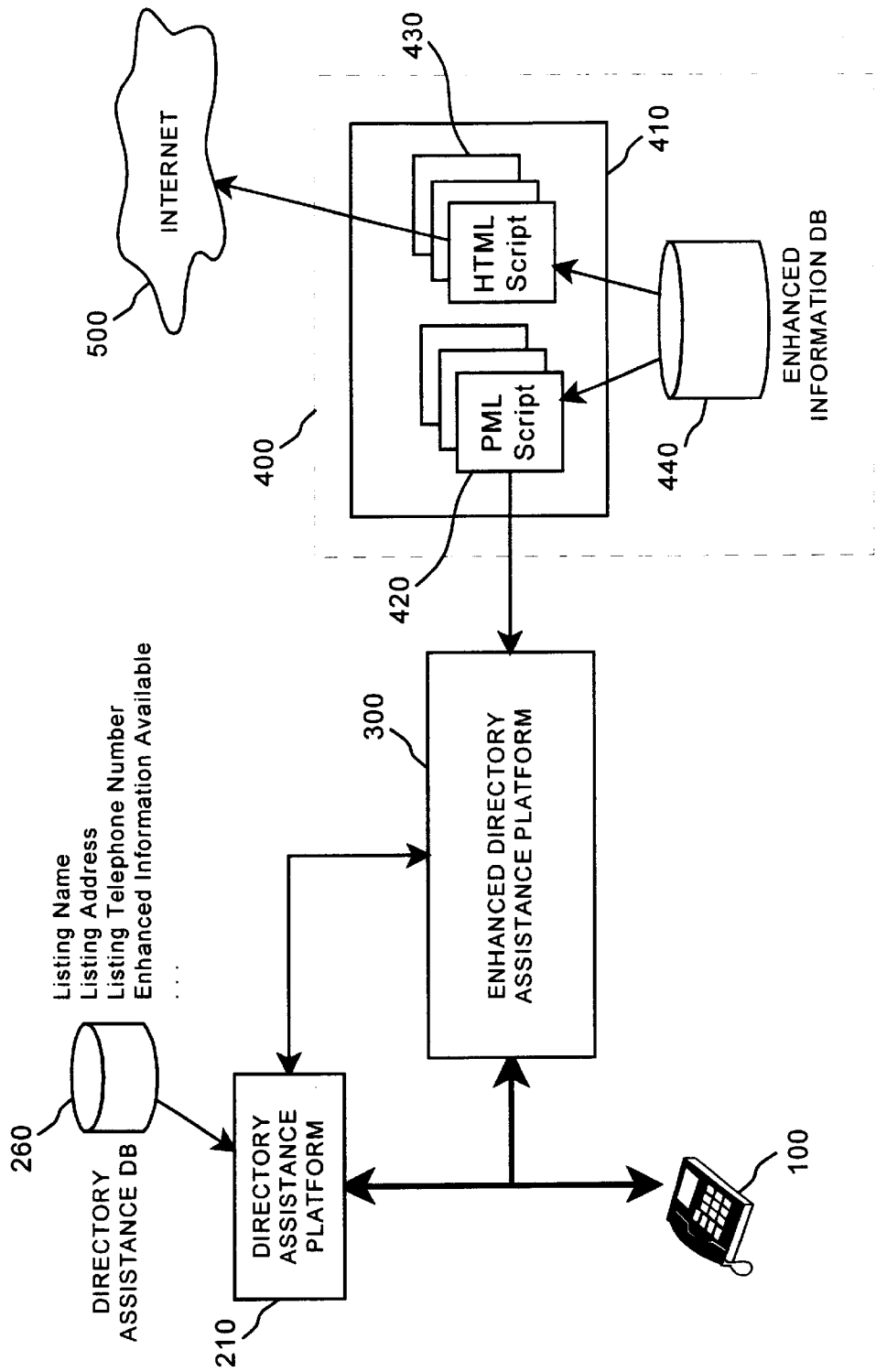
FIG. 2 is a block diagram of an enhanced directory assistance system according to an embodiment of the present invention.

The present invention is directed to a method and apparatus that provide enhanced directory assistance information. Referring now in detail to the drawings wherein like parts are designated by like reference numerals throughout, there is illustrated in FIG. 2 an enhanced directory assistance system according to an embodiment of the present invention. As described above, the server 400 contains an HTML script 430 capable of displaying a listed party's Web page to a user over the Internet 500. This HTML script 430 can incorporate information stored in an enhanced information database 440. For example, the HTML 430 script may include a reference to an audio file called "daily_special." The actual "daily_special" audio file can be stored in the enhanced information database 440. In this way, the listed party can simply update the enhanced information database 440 and the HTML script 430, without being modified, will automatically use the updated information. Although a "daily_special" audio file is used as an example to illustrate an embodiment of the present invention, any other type of enhanced directory information may be provided instead. The enhanced information database 440 can be located at the server 400 or, if desired, at some other location.

According to an embodiment of the present invention, the script information 410 in the server 400 also includes information that may be accessed over a telephone connection, such as a Phone Markup Language (PML) script 420. A PML script may be advantageously implemented using the technology described in U.S. patent application Ser. No. 08/635,801 filed Apr. 22,1996, entitled "Method and Apparatus for Information Retrieval Using Audio Interface," which is incorporated herein by reference. As used herein, the phrase "telephone connection" refers to any connection established over a voice communication channel, including, for example, connections established using a Public Switched Telephone Network (PSTN), a wireless network or an Internet Protocol (IP) telephony system. PML is an extension of HTML that has special marks for the telephone interface. For example, the PML script 420 may indicate that text should be converted by a text-to-speech synthesizer and read over the telephone. The PML script 420 can also interact with a user, by, for example, allowing selections with a touch tone telephone. Just as with an HTML script, a PML script is transferred using HTTP. Moreover, the PML script 420 can also incorporate information from the same enhanced information database 440 that is used by the HTML script 430.

To access the information in the enhanced information database 440, a person uses a telephone 100 to place a call to a directory assistance platform 210. The directory assistance platform 210 could include a live directory assistance operator, or could be a completely automated Interactive Voice Response (IVR) system. An operator at the directory assistance platform would, for example, use a directory assistance database 260 to find the telephone number or address of a particular listed party based on a name provided by the user. According to an embodiment of the present invention, the directory assistance database 260 can also contain the URL of the listed party. The telephone number of the listed party can also be "translated," or used to look the URL of the listed party, if desired.

In addition to the listed party's name, address and telephone number, the directory assistance database 260 can include an indication of whether enhanced information is available for that party. Another method of determining whether enhanced information is available would be to query a special database (not shown in FIG. 2) maintained either at the directory assistance platform 260 or at some other location. If enhanced directory information is not available, the operator can simply provide the telephone number and address of the listed party as is normally done.

If enhanced directory assistance information is available, the operator transfers the telephone call to an enhanced directory assistance platform 300. At this point, the operator may no longer be involved with the telephone call and the signal does not need to stay routed through the directory assistance platform 210. Note that even after the telephone call is transferred, the connection may still be physically routed through the directory assistance platform 210, if desired. In addition to transferring the call, the directory assistance platform 210 provides the identity of the listed party to the enhanced directory assistance platform 300. For example, the directory assistance platform 210 could provide a telephone number or URL associated with the listed party to the enhanced directory assistance platform 300.

Based on the information provided by the directory assistance platform 210, the enhanced directory assistance platform 300 retrieves the PML script 420 associated with the listed party using HTTP. As explained above, the PML script 420 can incorporate information in an enhanced information database 440, which can be directly updated by the listed party. Thus, listed parties can update their enhanced directory listings and these updates will be immediately available to callers. The enhanced directory assistance platform 300 includes a processor that converts the PML script 420 into audio information that is provided to the user over the telephone 100. The user can also interact with the PML script 420 using, for example, touch tone signals or voice commands with an IVR system.

Thus, a directory assistance operator interacts with the customer to find the needed database listing associated with a listed party. If the listed party has an enhanced listing, and the customer wants the additional information, the operator switches the caller to the IVR system to access the enhanced information. This limits the time that the operator spends with the caller to the time it takes to find the requested listing, and the user navigates through the extended set of information without operator assistance. Because the enhanced information can contain audio files, the service could become an important information source for the user, as well as a completely new advertising medium for listed parties. Note that with a special directory assistance system, such as AT&T's "00" INFO$^{SM}$ service, multiple listings might satisfy the caller's query. In this case, either the existing PML scripts for each listing can be played sequentially or a special PML document can be constructed with information about each listed party. Such a multiple listing may be presented to the caller using a generated program. For instance, to hear information about two Mexican restaurants, the PML program may dynamically create a PML page that is interpreted by the directory assistance platform 300 to play the following audible message: "press'1' to hear information about a first restaurant or press'2' to hear information about a second restaurant."

Figure 3:
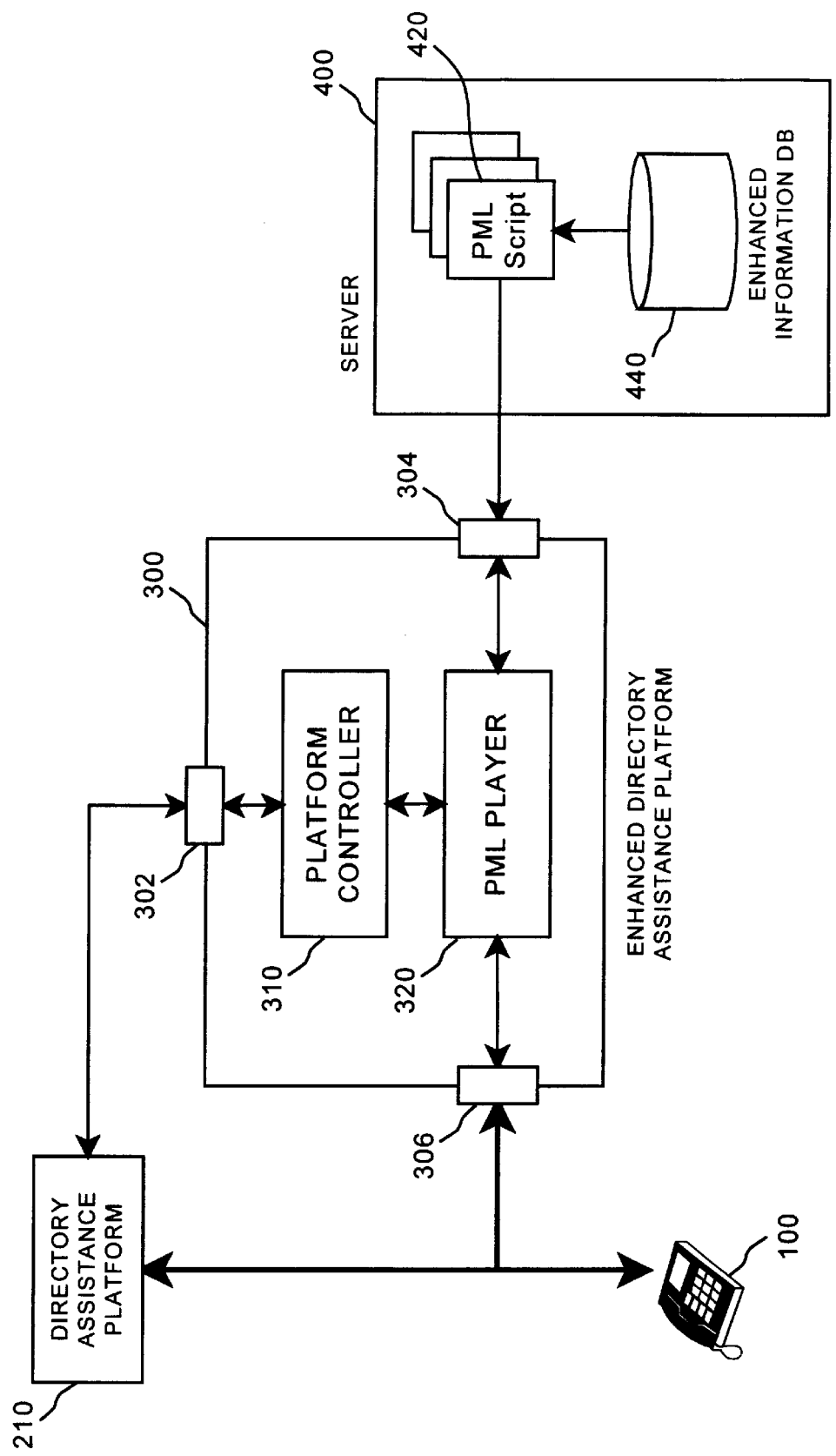
FIG. 3 is a more detailed block diagram of the enhanced directory assistance platform shown in FIG. 2.

FIG. 3 is a more detailed block diagram of the enhanced directory assistance platform shown in FIG. 2. As described above, the user accesses a directory assistance platform 210 using a telephone 100. When the identity of the listed party has been determined, the telephone call is transferred to the enhanced directory assistance platform 300 through, for example, a communications port 306. The directory assistance platform 210 can also transfer the identity of the listed party through a different communications port 302, or through the same communications port 306, if desired.

The enhanced directory assistance platform 300 can be, for example, an IVR system that communicates with a Web server 400 through another communications port 304. The enhanced directory assistance platform 300 requests a PML script 420, incorporating information stored in an enhanced information database 440, from the server 400. Although only a single server 400 is shown in FIG. 3, any number of servers can be used to support the enhanced directory assistance system.

The enhanced directory assistance platform 300 includes a PML player 320. The PML player 320 converts the PML script 420 into audio information that is provided to the user over the telephone 100. A platform controller 310 directs the PML player 320 to retrieve and then interpret, or play, the PML script 420 associated with the listed party based on information received from the directory assistance platform 210. Moreover, each directory assistance platform 300 may handle many independent calls. The platform controller 310 may handle the incoming telephone calls and make sure that the correct PML script is used on the correct port, line or telephone call. Thus, the enhanced directory assistance platform reformats information into audio form and transmits the information to the caller over the telephone connection.

The enhanced directory assistance platform 300 may also receive information from the user, such as a credit card or telephone number, and to forward that information to the listed party. Receiving information from a caller may also be specified in the PML page. For example, if the listed party wants to receive credit card information, the PML page may be programmed to ask for a credit card number and wait for touch tone signals. The PML player 320 would perform this function, such as by converting touch tone signals into a numerical value. The directory assistance platform 300 would get such a request from the PML page, and execute the request. The server 400 may also control other scripts that, for example, allow updating of the data in the enhanced information database 440, such as changes to existing listing or new listings. Such updates may be made over the Internet or through a telephone connection.

Instead of using pre-stored PML scripts 420, another embodiment of the present invention dynamically composes PML scripts based on information stored on the Web server 400. In this case, the server 400 would reformat the information as appropriate. Thus, the server 400 may dynamically composes the PML pages and the directory assistance platform 300 may receive the dynamically composed pages in the usual fashion. In another embodiment, a single script contains both HTML and PML elements. The single script may then be used for both PML and traditional Internet access.

A PML or HTML page may typically be generated dynamically. That is, the page may be constructed real-time, using the information in the enhanced information database 440 at that moment, as the result of a query. If desired, it would also be possible to periodically generate static pages based on information in the enhanced information database 440, but this may not be practical when there a large number of listed parties.

Figure 4:
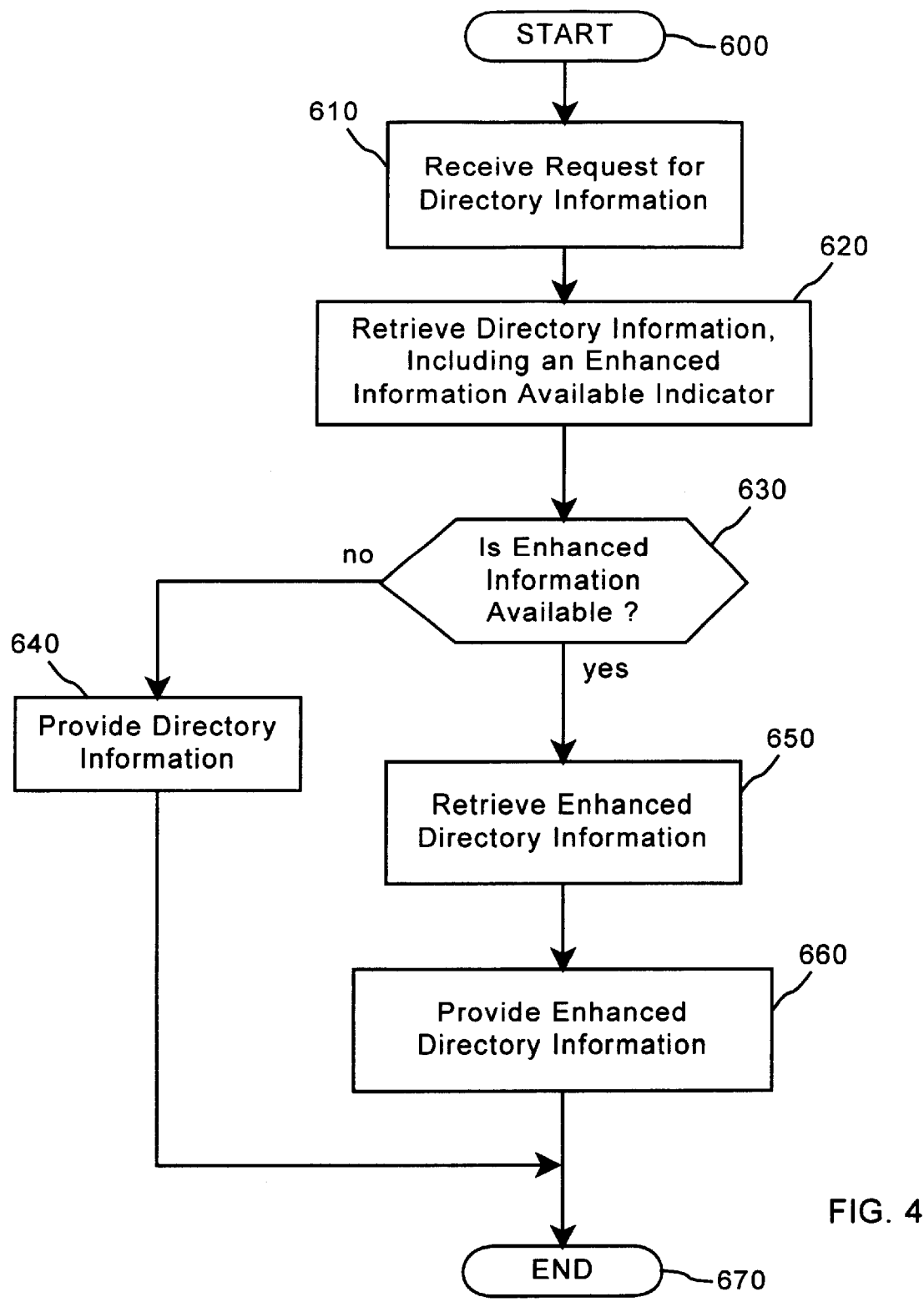
FIG. 4 is a block flow diagram of a process that provides enhanced directory assistance according to an embodiment of the present invention.

FIG. 4 is a block flow diagram of a process that provides enhanced directory assistance according to an embodiment of the present invention. After beginning at step 600, a request is received at step 610 over a telephone connection for directory information about a listed party. The directory information for the listed party, including an indication of whether enhanced information is available, is retrieved at step 620. If enhanced directory information is not available at step 630, normal directory assistance information is provided at step 640.

If enhanced directory information is available as indicated at step 630, the enhanced information is retrieved at step 650. The enhanced directory information is provided over the telephone connection at step 660 and the process ends at step 670.

Another embodiment of the present invention enhances the ability of special directory assistance, allowing a caller to make more sophisticated inquiries. This, however, may require that an operator remain on the line throughout the process. In this case, the operator would be the link between the caller and the enhanced information. That is, the operator, and not a computer based application program, provides the caller with detailed information.

It should be noted that one a caller is using the enhanced directory information system, the caller may chose to have the listed party's telephone number be automatically dialed. The enhanced directory information system may also let the caller select to return to a live directory assistance operator at any time, if desired.

Although various embodiments are specifically illustrated and described herein, it will be appreciated that modifications and variations of the present invention are covered by the above teachings and are within the purview of the appended claims without departing from the spirit and intended scope of the invention. For example, although certain types of "enhanced" information have been used to illustrate the present invention, it can be appreciated that other types of information will also fall within the scope of the invention. Moreover, the present invention is not dependent on the particular formats, such as PML and HTTP, that have been used to describe the invention.

What is claimed is:

1. A method of providing enhanced directory assistance, comprising the steps of:

receiving a request for directory information about a listed party;

determining if enhanced directory information for the listed party is available in an enhanced information database;

retrieving the enhanced directory information associated with the listed party, from the enhanced information database, as a script that incorporates the enhanced directory information; and providing the enhanced directory information using the script.

2. The method of claim 1, wherein said steps of receiving and providing are performed through a telephone connection.

3. The method of claim 2, wherein said step of receiving comprises receiving a telephone call signal at a first platform and said step of providing comprises routing the telephone call signal to a second platform.

4. The method of claim 1, wherein said step of retrieving comprises:

retrieving the enhanced directory information associated with the listed party as an interactive voice response script.

5. The method of claim 1, wherein said step of retrieving comprises:

retrieving the enhanced directory information associated with the listed party as a phone markup language script using hypertext transfer protocol.

6. The method of claim 5, wherein the phone markup language script incorporates information stored in the enhanced information database.

7. The method of claim 6, wherein the information stored in the enhanced information database is also incorporated by a hypertext markup language script to be transferred over the Internet.

8. The method of claim 1, wherein said step of determining comprises retrieving directory information, including an enhanced information indicator, from a directory database and determining whether enhanced directory information is available based on the enhanced information indicator.

9. The method of claim 1, wherein said step of providing the enhanced directory information is performed by dynamically constructing a phone markup language document based on information stored in a Web server database.

10. The method of claim 1, wherein the requested directory information relates to a plurality of listing parties and said steps of determining and providing are performed for each of the plurality of listing parties.

11. The method of claim 1, wherein said step of providing the enhanced directory information is performed using an interactive voice response system.

12. The method of claim 1, wherein said step of receiving is performed by a live directory assistance telephone operator.

13. The method of claim 1, wherein said step of receiving is performed by an automated directory assistance system.

14. The method of claim 1, further comprising the step of:
interacting with a user to provide additional information about the listed party through an interactive voice response system.

15. The method of claim 1, further comprising the steps of:
receiving information about a user; and
providing the information about the user to the listed party.

16. A method of providing enhanced directory assistance, comprising the steps of:
receiving a request for enhanced directory information, the request including an identifier associated with a listed party;
retrieving a phone markup language script associated with the listed party, the phone markup language script incorporating the enhanced directory information from an enhanced information database which is also referenced by a hypertext markup language script to be transferred over the Internet;
converting the phone markup language script into an audio format; and
providing to a user the audio format enhanced directory information.

17. The method of claim 16, further comprising the step of:
interacting with the user to provide additional information about the listed party through an interactive voice response system.

18. An enhanced directory assistance information platform, comprising:
a first communications port configured to receive a request for enhanced directory information, the request including an identifier associated with a listed party;
a processor coupled to said first communications port configured to retrieve a phone markup language script associated with the listed party, the phone markup language script incorporating the enhanced directory information from an enhanced information database which is also referenced by a hypertext markup language script to be transferred over the Internet, said processor being further configured to convert the phone markup language script into an audio format; and
a second communications port coupled to said processor and configured to provide to a user the audio format enhanced directory information.

19. The apparatus of claim 18, wherein said processor is further configured to interact with the user to provide additional information about the listed party through an interactive voice response system.

20. An apparatus to provide enhanced directory assistance comprising:
means for receiving a request for directory information about a listed party;
means for determining if enhanced directory information for the listed party is available in an enhanced information database;
means for retrieving the enhanced directory information associated with the listed party, from the enhanced information database, as a script that incorporates the enhanced directory information; and
means for providing the enhanced directory information if the enhanced directory information is available.

21. An apparatus to provide enhanced directory assistance, comprising:
means for receiving a request for enhanced directory information, the request including an identifier associated with a listed party;
means for retrieving a phone markup language script associated with the listed party, the phone markup language script incorporating the enhanced directory information from an enhanced information database which is also referenced by a hypertext markup language script to be transferred over the Internet;
means for converting the phone markup language script into an audio format; and
means for providing to a user the audio format enhanced directory information.

22. A method of providing access to a directory database, comprising the steps of:
receiving, over a telephone connection, a request for directory information about a listed party;
retrieving directory information associated with the listed party, the listed party being able to directly update the directory information such that updated information is available to a caller at substantially the time that the information is updated; and
providing the directory information over the telephone connection.

23. A method of providing a directory database, comprising the steps of:
receiving from a listed party updates to directory information associated with the listed party; and
automatically making the updated directory information available to a party seeking directory information over a telephone connection.

24. The method of claim 23, wherein said step of receiving is performed by receiving updates over a telephone connection.

25. The method of claim 23, wherein said step of receiving is performed by receiving updates over the Internet.

* * * * *